April 13, 1965     I. W. MUNDHENKE     3,178,069
BEVERAGE MAKING DEVICE
Filed Jan. 7, 1963     2 Sheets-Sheet 1
FIG. 1
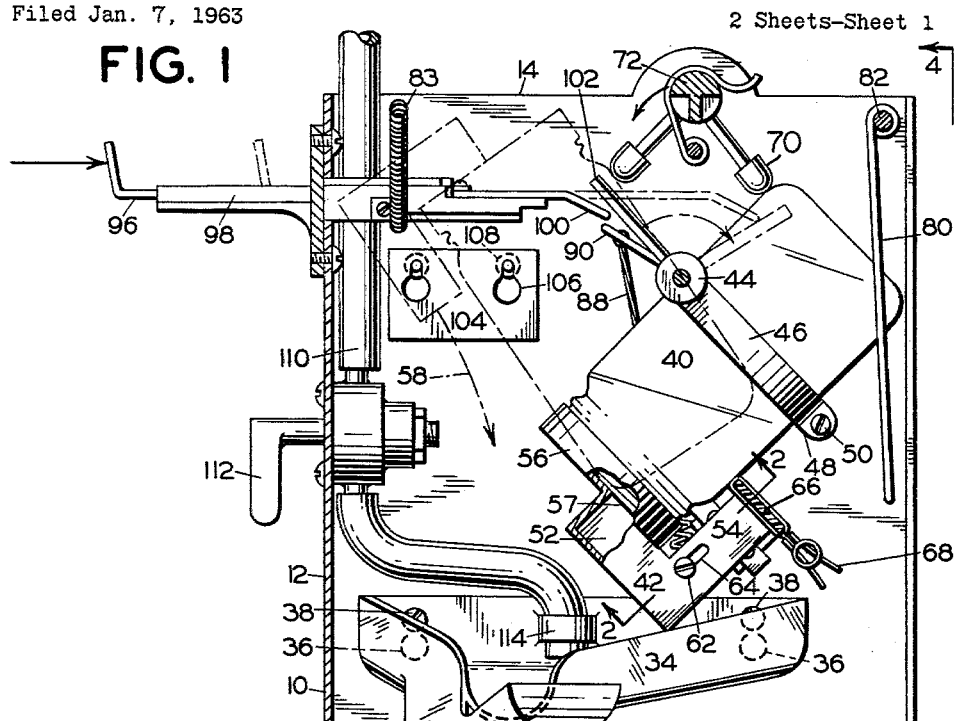
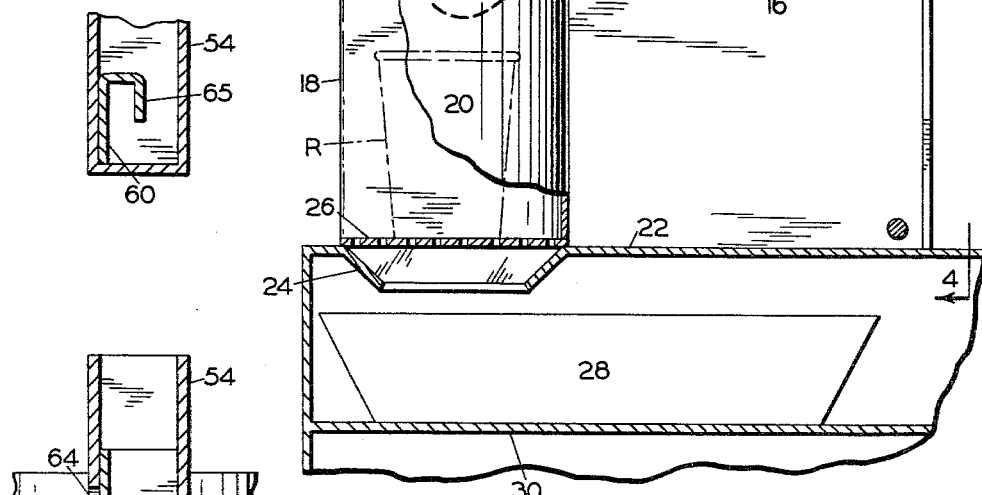
FIG. 3
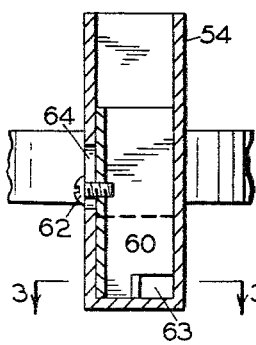
FIG. 2
INVENTOR.
IVAN W. MUNDHENKE
BY Eugene M. Eckelman
ATTORNEY April 13, 1965  I. W. MUNDHENKE  3,178,069
BEVERAGE MAKING DEVICE
Filed Jan. 7, 1963  2 Sheets-Sheet 2

INVENTOR.
IVAN W. MUNDHENKE
BY Eugene M. Eckelman
ATTORNEY

United States Patent Office 3,178,069
Patented Apr. 13, 1965

3,178,069
BEVERAGE MAKING DEVICE
Ivan W. Mundhenke, 2043 SE. 88th Ave., Portland, Oreg.
Filed Jan. 7, 1963, Ser. No. 249,781
3 Claims. (Cl. 222—166)

This invention relates to a beverage making or dispensing device and more particularly pertains to a novel device for making and dispensing instant coffee or similar beverages.

An important object of the present invention is to provide a device for making beverage which is simple in structure and economical to manufacture, and therefore capable of use in many situations where expensive automatic dispensers are not desirable.

Another object is to provide a beverage making device which has a minimum of working parts and which requires little or no maintenance by skilled workmen.

It is another object to provide a beverage making device having a novel structure facilitating easy manual operation thereof.

Still another object is to provide a beverage making device employing novel measuring and dispensing means for discharging a selected quantity of dry beverage material in each operation thereof.

Another object is to provide a beverage making device employing a novel arrangement of manually operated coin slide and rotatable dispensing means.

In brief, the beverage making device of the invention comprises a novel arrangement of structure utilizing a rotatable dry beverage holding container, a coin slide adapted to engage holding means for the container for rotating the latter between limit positions defined by pumpers, and tray means for directing dry beverage material from the container to a receptacle. The rotatable container carries novel measuring means adapted to discharge a selected quantity of the material in each operation. The device may also employ conduit means adapted to direct hot water into the tray for mixing with the dry beverage material.

The invention will be better understood and additional objects and advantages will become apparent from the following description taken in connection with the accompanying drawing which illustrate a preferred form of the device. It is to be understood, however, that the invention may take other forms and all such modifications and variations within the scope of the appended claims which will occur to persons skilled in the art are included in the invention.

In the drawings:

FIGURE 1 is a side elevational view of working parts of the present beverage making device, taken on the line 1—1 of FIGURE 4;

FIGURE 2 is an enlarged sectional view of the measuring means taken on the line 2—2 of FIGURE 1, and showing in particular adjustment means for varying the quantity of dry beverage material discharged by the measuring means;

FIGURE 3 is a fragmentary sectional view of the measuring means taken on the line 3—3 of FIGURE 2;

Figure 6:
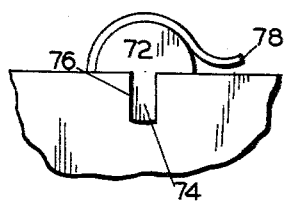
FIGURE 6 is a fragmentary elevational view showing in end elevation a bumper supporting bar, taken on the line 6—6 of FIGURE 4.
Figure 5:
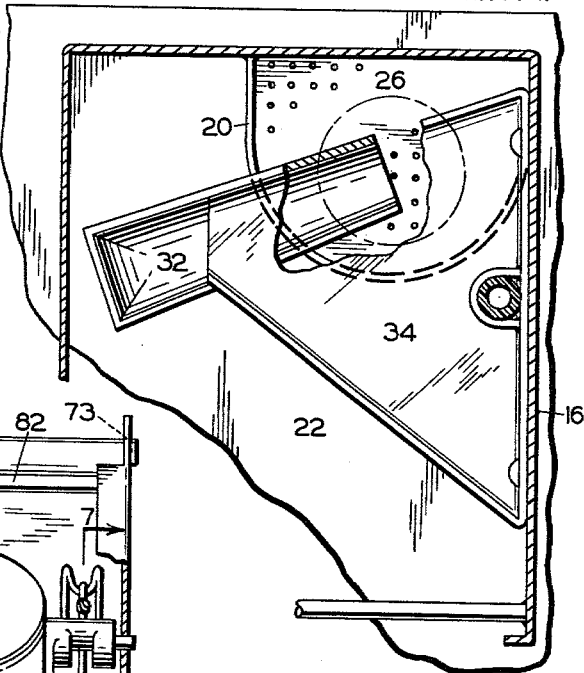
FIGURE 5 is a fragmentary sectional view showing tray means for receiving and mixing ingredients of the beverage, taken on the line 5—5 of FIGURE 4.

Referring particularly to the drawings, the present beverage making device comprises a housing or casing 10 having a front wall 12, a top wall 14, and side walls 16. The front wall 12 has an opening 18 adjacent the lower portion thereof leading into a side wall enclosed area 20 for receiving a receptacle R to be filled. Housing 10 has a bottom wall 22 provided with a drain channel 24, and the receptacle receiving area 20 has a perforated bottom wall 26 overlying the channel. The receptacle to be filled is supported on the bottom wall 26 whereby any overflow from the receptacle flows through said wall and into the channel 24 for deposite in the container 28 supported on an auxiliary bottom wall 30 of the housing 10.

Leading into the receptacle area 20 is a nozzle portion 32 of a mixing tray 34 adapted for reception of a dry beverage material from a measuring and dispensing mechanism to be described and also for the reception of a liquid such as hot water. In the arrangement shown, tray 34 is inclined and the nozzle 32 which depends from said tray, also is inclined whereby material deposited into the tray will move downwardly by gravity and be discharged from the nozzle, the discharge end of the nozzle being positioned to deposit material in the receptacle R. The tray 34 is preferably detachably mounted in the housing 10, and for this purpose one wall of the tray is provided with bayonet slots 36 and the wall of the housing is provided with headed pins 38 receivable in the bayonet slots. Thus, the tray may be removed for easy cleaning.

Dry beverage material such as instant coffee is adapted to be deposited into the tray 34 by means of a measuring and dispensing mechanism comprising a container 40 having a measuring nozzle 42 thereon. The container is mounted on a shaft 44 journaled in opposite side walls 16 of the housing 10, and has rotatable movement with said shaft between a discharging or dispensing position, shown in dotted lines in FIGURE 1, and a charging position shown in full lines. Mounting of the container 40 on the shaft 44 is accomplished by a pair of arcuate straps 46 having end ears 48 for receiving a screw 50, thus forming means for securely but detachably mounting the container on the shaft.

The measuring nozzle 42 is adapted to deposit a predetermined quantity of the contents of container 40 into the tray and comprises a filling portion 52 and a spout 54, the spout being disposed at substantially right angles to the filling portion 52. The measuring nozzle 42 preferably is supported on a lid 56 of the container, such lid having an opening 57 establishing communication between the container 40 and the filling portion 52.

In the downwardly inclined position of the container shown in full lines in FIGURE 1, a quantity of the contents flows into the filling portion 52, depending upon the volumetric capacity of said filling portion, and upon rotation of the container to its upwardly inclined position such quantity as was deposited in the filling portion is discharged from the spout 54 as indicated by the arrow 58 in FIGURE 1 to fall on the mixing tray 34. Thus, a quantity of the contents from container 40 will flow into said measuring device each time the container is rotated between its upwardly and downwardly inclined positions.

For the purpose of varying and precisely controlling the quantity of material discharged by the measuring nozzle, an angular baffle 60, best seen in FIGURES 2 and 3, is mounted interiorly of the measuring nozzle. Preferably the baffle 60 is mounted in the spout portion 54 with one wall thereof lying along one side wall of portion 54 and the other wall projecting across the spout end of the filling portion 52. Such baffle is adjustably mounted on said spout portion for varying the extent of projection across the filling portion 52, such adjustment being accomplished by a screw 62 threadedly mounted in the baffle 60 and projecting through an elongated slot 64 in the wall of nozzle 54. To increase the size of the charge of dry material dispensed, the baffle 60 is adjusted upwardly as seen in FIGURE 2 to enlarge the cross sectional reception area of the filling portion 52. If a smaller charge is desired, such plate is adjusted downwardly to reduce the reception area of the filling portion 52.

Preferably, however, the baffle 60 is maintained in a fully downward position and is provided with a cut-out 63 formed by partially cutting transversely the wall which projects across the spout end of the filling portion and bending the cut portion 65 to an angular position relative to such wall and in a direction of flow of material through the device.

By this structural arrangement, a precise quantity of dry material is measured and deposited out the spout when the container is tipped up. More particularly, a quantity of material flows through the cut-out 63 when the container is returned to its rest position as shown in full lines in FIGURE 1, and is in readiness to fall from the nozzle portion when the container is rotated to its dispensing position, as shown in broken lines in FIGURE 1. To vary the quantity of each charge, the tab 65 is bent at different angles relative to the baffle 60. That is, to increase the size of the charge, tab 65 is bent in a clockwise direction, FIGURE 3, to increase the area of deposit behind the opening 63 and to decrease the size of the charge, the tab 65 is bent in the opposite direction.

Means are provided for closing off the open end of nozzle 54 when the container is disposed in its full line charging position, comprising a transversely located plate 66 preferably of flexible material and secured to opposite sides of the housing. This plate is located in a predetermined position so as to be in the path of the nozzle end in the charging position of the container, as shown in FIGURE 1, thus preventing entrance of dust or other foreign material into the upturned spout portion.

In the dispensing of instant coffee, however, it has been found that a nozzle end of a dispensing nozzle will stick to a closure plate since this portion is dampened by steam, and instant coffee, being finely ground, has adhesive qualities. To provide for improved release of the nozzle end from its closure member a thin piece of sheeting or covering 67 is secured to the plate at the point of nozzle engagement. This covering is removably secured in place by a spring clip 68 and more particularly by draping a piece of the sheeting over the plate 66 and anchoring the projecting ends with the clip. By such means the covering is easily replaceable.

The covering 67 preferably comprises a thin piece of plastic sheeting or other material which is very flexible, and since it is very flexible it will release much easier from the nozzle than a semi-flexible plate. This is due to the fact that with a semi-flexible plate the nozzle attempts to pull away from the entire surface of all the engaging edges at the same time while with a thin flexible sheeting the latter is distorted outwardly in the initial rotation of the nozzle and peels off starting with the area around the outer edges. This peeling action facilitates release of the nozzle from its closure member and does not restrain appreciably the rotation of the container.

Rotational movement of the container 40 between its two limit positions is controlled by a pair of angularly disposed bumpers 70 secured by a transverse bar 72 and being positioned in selected relation to the container for the intended purpose. Bar 72 is mounted on the housing in non-rotatable relation but is conveniently detachable from the housing so that it may be removed to permit the container to be rotated to a fully upright position for filling. For this purpose one end of the bar is supported in an aperture 73, FIGURE 4, in one side wall 16 of the housing and the other end has an end tongue 74, FIGURES 4 and 6, engageable in an upwardly directed slot 76 in the other side wall 16 of the housing. By this arrangement, the bar 72 is mounted in a non-rotatable position with the result that the bumpers 70 are stationary for engagement by the container 40 and thereby establish limit positions of the latter as clearly shown in FIGURE 1.

In addition to establish limit positions for the container, the bumpers 70 upon being contacted by the container serve to shake a charge of dry beverage material into the measuring nozzle in its charging position and to shake the charge from the nozzle into the mixing tray in its dispensing position. In this regard, the bumpers may be located at any desired position to assist in the gravity movement of the dry beverage material or if desired they may be located to cause the material to be shaken out without an assist from gravity.

Bar 72 is held in place by a pivotally mounted spring latch 78, and may be removed conveniently by releasing the spring latch, lifting the tongue end upwardly to clear the top edge of the side wall 16, and then moving the bar longitudinally to disengage it from the aperture 73. Upon removal of the bar assembly from the housing, the containing 40 is permitted to rotate to a fully upright position. A wire hook 80 pivotally mounted on a cross bar 82, is adapted to engage the jar and hold it in its fully upright filling position.

Also to assist in the removal of a measured quantity of coffee from the nozzle 42, there is employed a spring 83. One end of this spring is secured to a wall of the housing and the other end of said spring projects into the path of the nozzle 42 in the upward dispensing position thereof. More particularly, this spring is arranged such that as the container approaches a dispensing position, as shown by the dotted lines in FIGURE 1, the nozzle thereof engages the spring 83 and the latter is caused to vibrate. The vibrations of the spring are transferred somewhat to the nozzle to release the coffee from the nozzle.

Figure 4:
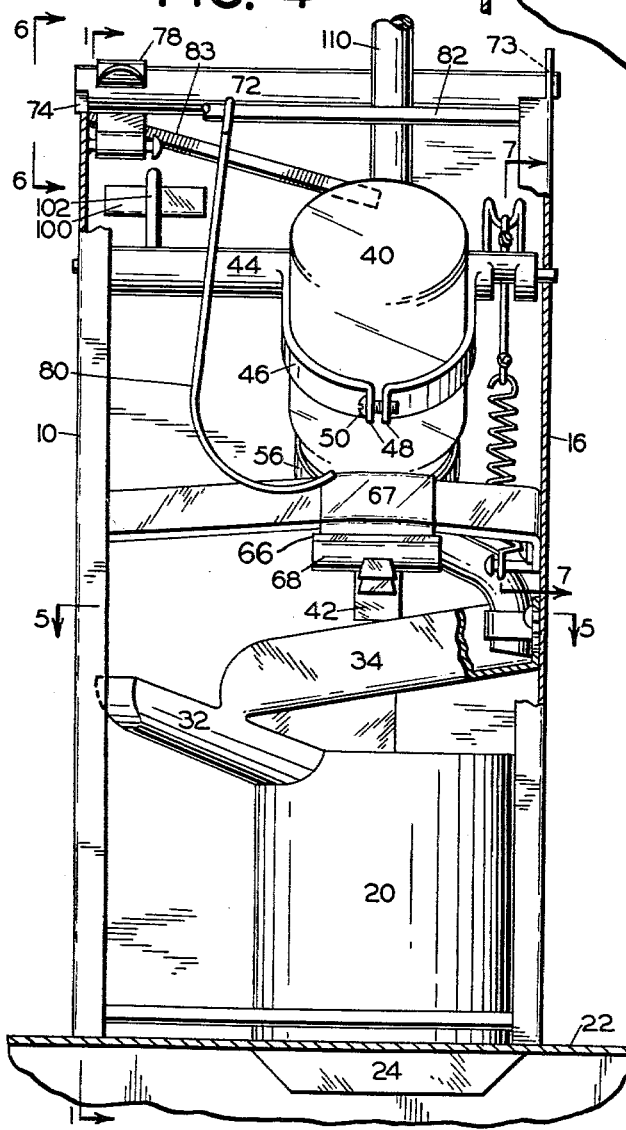
FIGURE 4 is a rear elevational view of the present apparatus, taken on the line 4—4 of FIGURE 1.
Figure 7:
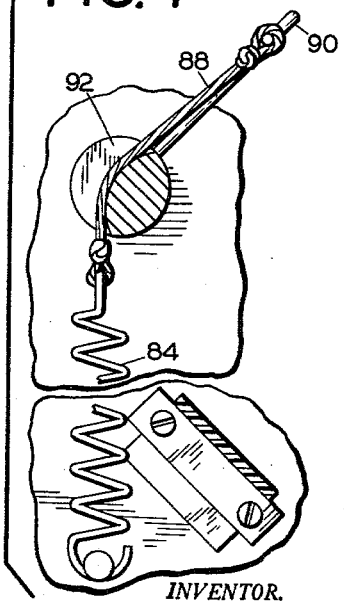
FIGURE 7 is a fragmentary sectional view showing a spring arrangement for accomplishing return movement of the dry beverage holding container, taken on the line 7—7 of FIGURE 4.

Container 40 is urged to its charging position by means of a spring 84, FIGURES 4 and 7, having one end anchored to a pin 86 on the housing and its opposite end connected to a cable portion 88 in turn connected to the outer end of an arm member 90 rigidly mounted on the shaft 44. Shaft 44 has a transverse slot 92 for receiving the cable 88 therein as best seen in FIGURE 6. By this arrangement, the spring is tensioned, when the container is rotated to its upwardly inclined dispensing position, for returning the container to its charging position, and by the escapement of the cable in the slot 92, the spring will not be over-tensioned and will have substantially a uniform tension thereon throughout the entire rotation of the container.

More particularly, it will be apparent from FIGURE 3 that in the charging position of the container, the slot 92 is disposed downwardly and thereby has no effect on the spring. The spring in this position is arranged to hold the container in its charging position. Upon rotation of the shaft 44, arm 90 carries the end of the cable over the shaft and the cable engages slot 92, which moves to an outward or upward facing position, thus the length between the opposite end connections of the spring is not unduly lengthened. The spring thus is not over-tensioned.

Rotation of the container 40 from its charging position to its discharging position is accomplished manually by a coin operated slide 96 operating in a guide 98. The inner end of slide 96 terminates in a downwardly inclined finger or end portion 100 which projects beyond the inner end of guide 98 and is adapted to engage an arm 102 forming an integral part of the shaft 44. The slide 96 and guide 98 comprise conventional structure wherein when a coin is inserted in the slide it is permitted to move inwardly relative to the guide. Such inward movement causes finger 100 to engage the arm 102 to rotate the container assembly to its dotted line position against the force of spring 84, the inner position of the slide being shown in dotted lines in FIGURE 1. Upon retraction of the slide 96 to its full line position of FIGURE 1, spring 84 returns the container to its charging position.

It will be noted that the pivot point 44 is offset from the path of travel of the slide 96 and the finger portion 100 projects downwardly or more particularly is bent toward the shaft. Through the medium of the linearly traveling coin slide means, its location, and the angular portion 100, inward movement of the coin slide causes it to advance progressively closer to the pivot point and thus obtain a considerable amount of rotation of the container for a short linear travel of the slide. The rotation of the container as compared to linear travel of the coin slide means is even more increased as a result of the angled portion 100.

The device is equipped with a coin box 104 for receiving coins from the slide. This box is preferably removably mounted in the housing and for this purpose has bayonet slots 106 removably engageable with headed pins 108 on the housing.

Housing 10 is also equipped with conduit means 110 leading into the tray 34. This conduit has a valve 112 therein for controlling the flow of liquid into the tray, such as hot water.

In a preferred arrangement the lower end of conduit 110 terminates interiorly of the tray 34 and is removably attached thereto by means of a strap loop 114 secured to an inner wall surface of the tray.

Having now described my invention and in what manner the same may be used, what I claim to be new and to protect by Letters Patent is:

1. A dispensing device for powdered beverage material comprising a housing, a shaft journaled in said housing having a transverse surface slot, a container for said powdered material secured to said shaft and rotatable therewith to a pair of limit positions comprising a nozzle filling position and a discharge position, said container having a nozzle portion for discharging a selected quantity of the beverage material from said container upon rotation of the latter to its discharge position, a pair of stationary, resilient bumpers secured to said housing in a position for engagement by said container to stop said container in both its limit positions, a radially projecting arm on said shaft, a slide member slidably supported in said housing and arranged for engagement with said arm for rotating said container to its beverage discharge position, and spring means operating on said shaft to normally maintain the latter in a position of nozzle filling of said dispensing device, said spring means being anchored in a stationary position at one of its ends to the housing and being connected at its other end to said shaft with an intermediate portion thereof being wrapped partially around said shaft and in alignment with said slot, whereby upon rotation of said shaft in one direction said spring means engages with said slot to maintain substantially uniform tensioning in the spring means on all rotative positions of said shaft.

2. A dispensing device for powdered beverage material comprising a housing, a shaft journaled in said housing, a container for said powdered material secured to said shaft and rotatable therewith to a pair of limit positions comprising a nozzle filling position and a discharge position, said container having a nozzle portion for discharging a selected quantity of the beverage material from said container upon rotation of the latter to its discharge position, a pair of stationary, resilient bumpers secured to said housing in a position for engagement by said container to stop said container in both its limit positions, a radially projecting arm on said shaft, a slide member slidably supported in said housing and arranged for engagement with said arm for rotating said container to its beverage discharge position, spring means operating on said shaft to normally maintain the latter in a position of nozzle filling of said dispensing device, and a spring member projecting inwardly from said housing and arranged for engagement by said nozzle as the latter nears a discharge position of said dispensing device, said spring upon engagement thereof by said nozzle being vibrated for shaking the beverage material from the nozzle.

3. A dispensing device for powdered beverage material comprising a housing, a shaft journaled in said housing, a container for said powdered material secured to said shaft and rotatable therewith to a pair of limit positions comprising a nozzle filling position and a discharge position, a nozzle on said container, a filling portion in said nozzle communicating with the interior of the container, a spout on said nozzle for discharging a quantity of material deposited in said filling portion, a wall of bendable material secured between said filling portion and said spout, a tab cut in said wall arranged to be bent into selected positions of angular adjustment relative to said wall to form discharge openings of various sizes for discharging a selected quantity of the beverage material from said container upon rotation of the latter to its discharge position, a pair of stationary, resilient bumpers secured to said housing in a position for engagement by said container to stop said container in both its limit positions, a radially projecting arm on said shaft, a slide member slidably supported in said housing and arranged for engagement with said arm for rotating said container to its beverage discharge position, and spring means operating on said shaft to normally maintain the latter in a position of nozzle filling of said dispensing device.

References Cited by the Examiner
UNITED STATES PATENTS

| | | | |
|---|---|---|---|
| 1,765,622 | 6/30 | Schoen | 222—359 X |
| 2,316,315 | 4/43 | Casey | 221—188 |
| 2,671,575 | 3/54 | Hilton | 222—23 |
| 2,762,527 | 9/56 | Manley | 222—166 X |
| 2,800,257 | 7/57 | Nixon | 222—454 |
| 2,903,163 | 9/59 | Newman | 222—454 X |
| 3,047,194 | 7/62 | Reynolds et al. | 222—448 X |

EVERETT W. KIRBY, *Primary Examiner.*

ERNEST A. FALLER, Jr., LOUIS J. DEMBO,
*Examiners.*